United States Patent
Weiner

(10) Patent No.: US 9,828,943 B2
(45) Date of Patent: Nov. 28, 2017

(54) VARIABLE AREA NOZZLE FOR GAS TURBINE ENGINE

(71) Applicant: United Technologies Corporation, Hartford, CT (US)

(72) Inventor: Richard Alan Weiner, Farmington, CT (US)

(73) Assignee: United Technologies Corporation, Farmington, CT (US)

( * ) Notice: Subject to any disclaimer, the term of this patent is extended or adjusted under 35 U.S.C. 154(b) by 245 days.

(21) Appl. No.: 14/709,654

(22) Filed: May 12, 2015

(65) Prior Publication Data

US 2016/0003190 A1 Jan. 7, 2016

Related U.S. Application Data

(60) Provisional application No. 62/009,480, filed on Jun. 9, 2014.

(51) Int. Cl.

| F02K 1/08 | (2006.01) |
|---|---|
| F02K 1/76 | (2006.01) |
| F02K 1/12 | (2006.01) |
| F02C 7/14 | (2006.01) |
| F02K 1/15 | (2006.01) |
| F02K 1/62 | (2006.01) |

(52) U.S. Cl.
CPC .............. *F02K 1/763* (2013.01); *F02C 7/14* (2013.01); *F02K 1/08* (2013.01); *F02K 1/085* (2013.01); *F02K 1/1223* (2013.01); *F02K 1/15* (2013.01); *F02K 1/62* (2013.01); *F05D 2260/213* (2013.01); *Y02T 50/676* (2013.01)

(58) Field of Classification Search
CPC . F02K 1/763; F02K 1/08; F02K 1/085; F02K 1/1223; F02K 1/15; F02K 1/62; F02C 7/14; F05D 2260/213
See application file for complete search history.

(56) References Cited

U.S. PATENT DOCUMENTS

| 3,287,906 A | 11/1966 | McCormick |
| 3,289,946 A | 12/1966 | Lennard |

(Continued)

FOREIGN PATENT DOCUMENTS

| GB | 1516041 | 6/1978 |
| GB | 2041090 | 9/1980 |
| WO | 2007038674 | 4/2007 |

OTHER PUBLICATIONS

Conference on Engineering and Physics: Synergy for Success 2006. Journal of Physics: Conference Series vol. 105. London, UK. Oct. 5, 2006.

(Continued)

*Primary Examiner* — Steven Sutherland
(74) *Attorney, Agent, or Firm* — Carlson, Gaskey & Olds, P.C.

(57) ABSTRACT

A variable area fan nozzle comprises an actuator flap and a follower flap. The actuator flap has a portion in contact with a portion of the follower flap. A bias member biases the follower flap outwardly. An actuator actuates the actuator flap inwardly and outwardly to, in turn, move the follower flap against the bias member and to vary an area of an exhaust nozzle. The flap actuator is operable to drive the actuator flap out of contact with the follower flap into a thrust reverser position.

20 Claims, 6 Drawing Sheets

(56) References Cited

U.S. PATENT DOCUMENTS

| | | | | |
|---|---|---|---|---|
| 3,352,494 | A | * | 11/1967 | Roberts .................. F02K 1/08 |
| | | | | 181/215 |
| 3,598,318 | A | | 8/1971 | Schiel |
| 3,754,484 | A | | 8/1973 | Roberts |
| 3,892,358 | A | | 7/1975 | Gisslen |
| 4,073,440 | A | * | 2/1978 | Hapke .................. F02K 1/74 |
| | | | | 239/265.29 |
| 4,074,859 | A | * | 2/1978 | Lowman, Jr. .......... B64D 33/04 |
| | | | | 239/265.33 |
| 4,130,872 | A | | 12/1978 | Haloff |
| 4,793,134 | A | * | 12/1988 | Coplin .................. F02K 1/68 |
| | | | | 239/265.31 |
| 5,181,676 | A | | 1/1993 | Lair |
| 5,433,674 | A | | 7/1995 | Sheridan et al. |
| 5,447,411 | A | | 9/1995 | Curley et al. |
| 5,524,847 | A | | 6/1996 | Brodell et al. |
| 5,655,360 | A | | 8/1997 | Butler |
| 5,778,659 | A | | 7/1998 | Duesler et al. |
| 5,806,302 | A | | 9/1998 | Cariola et al. |
| 5,857,836 | A | | 1/1999 | Stickler et al. |
| 5,915,917 | A | | 6/1999 | Eveker et al. |
| 5,975,841 | A | | 11/1999 | Lindemuth et al. |
| 6,145,301 | A | * | 11/2000 | Gonidec .................. F02K 1/68 |
| | | | | 239/265.27 |
| 6,223,616 | B1 | | 5/2001 | Sheridan |
| 6,318,070 | B1 | | 11/2001 | Rey et al. |
| 6,814,541 | B2 | | 11/2004 | Evans et al. |
| 7,021,042 | B2 | | 4/2006 | Law |
| 7,591,754 | B2 | | 9/2009 | Duong et al. |
| 7,824,305 | B2 | | 11/2010 | Duong et al. |
| 7,926,260 | B2 | | 4/2011 | Sheridan et al. |
| 8,104,261 | B2 | | 1/2012 | Marshall et al. |
| 8,104,262 | B2 | | 1/2012 | Marshall |
| 8,127,529 | B2 | | 3/2012 | Pero et al. |
| 8,151,551 | B2 | | 4/2012 | Pero |
| 8,205,432 | B2 | | 6/2012 | Sheridan |
| 8,418,436 | B2 | | 4/2013 | Pero et al. |
| 2010/0148396 | A1 | | 6/2010 | Xie et al. |
| 2010/0180571 | A1 | | 7/2010 | Zysman et al. |
| 2010/0331139 | A1 | | 12/2010 | McCune |
| 2012/0168115 | A1 | | 7/2012 | Raimarckers et al. |

OTHER PUBLICATIONS

Kurzke, J. (2009). Fundamental differences between conventional and geared turbofans. Proceedings of ASME Turbo Expo: Power for Land, Sea, and Air. 2009, Orlando, Florida.

Agarwal, B.D and Broutman, L.J. (1990). Analysis and performance of fiber composites, 2nd Edition. John Wiley & Sons, Inc. New York: New York.

Carney, K., Pereira, M. Revilock, and Matheny, P. Jet engine fan blade containment using two alternate geometries. 4th European LS-DYNA Users Conference.

Brines, G.L. (1990). The turbofan of tomorrow. Mechanical Engineering: The Journal of the American Society of Mechanical Engineers, 108(8), 65-67.

Faghri, A. (1995). Heat pipe and science technology. Washington, D.C.: Taylor & Francis.

Hess, C. (1998). Pratt & Whitney develops geared turbofan. Flug Revue 43(7). Oct. 1998.

Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.

Griffiths, B. (2005). Composite fan blade containment case. Modern Machine Shop. Retrieved from: http://www.mmsonline.com/articles/composite-fan-blade-containment-case.

Hall, C.A. and Crichton, D. (2007). Engine design studies for a silent aircraft. Journal of Turbomachinery, 129, 479-487.

Hague, A. and Shamsuzzoha, M., Hussain, F., and Dean, D. (2003). S20-glass/epoxy polymer nanocomposites: Manufacturing, structures, thermal and mechanical properties. Journal of Composite Materials, 37(20), 1821-1837.

Brennan, P.J. and Kroliczek, E.J. (1979). Heat pipe design handbook. Prepared for National Aeronautics and Space Administration by B & K Engineering, Inc. Jun. 1979.

Horikoshi, S. and Serpone, N. (2013). Introduction to nanoparticles. Microwaves in nanoparticle synthesis. Wiley-VCH Verlag GmbH & Co. KGaA.

Kerrebrock, J.L. (1977). Aircraft engines and gas turbines. Cambridge, MA: The MIT Press.

Xie, M. (2008). Intelligent engine systems: Smart case system. NASA/CR-2008-215233.

Knip, Jr., G. (1987). Analysis of an advanced technology subsonic turbofan incorporating revolutionary materials. NASA Technical Memorandum. May 1987.

Willis, W.S. (1979). Quiet clean short-haul experimental engine (QCSEE) final report. NASA/CR-159473.

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press.

Ramsden, J.M. (Ed). (1978). The new European airliner. Flight International, 113(3590). Jan. 7, 1978.

Langston, L. and Faghri, A. Heat pipe turbine vane cooling. Prepared for Advanced Turbine Systems Annual Program Review. Morgantown, West Virginia. Oct. 17-19, 1995.

Oates, G.C. (Ed). (1989). Aircraft propulsion systems and technology and design. Washington, D.C.: American Institute of Aeronautics, Inc.

Lau, K., Gu, C., and Hui, D. (2005). A critical review on nanotube and nanotube/nanoclay related polymer composite materials. Composites: Part B 37(2006) 425-436.

Shorter Oxford English dictionary, 6th Edition. (2007). vol. 2, N-Z. p. 1888.

Lynwander, P. (1983). Gear drive systems: Design and application. New York, New York: Marcel Dekker, Inc.

Sweetman, B. and Sutton, O. (1998). Pratt & Whitney's surprise leap. Interavia Business & Technology, 53.621, p. 25.

Mattingly, J.D. (1996). Elements of gas turbine propulsion. New York, New York: McGraw-Hill, Inc.

Pyrograf-III Carbon Nanofiber. Product guide. Retrieved from: http://pyrografproducts.com/Merchant5/merchant.mvc?Screen=cp_nanofiber.

Nanocor Technical Data for Epoxy Nanocomposites using Nanomer 1.30E Nanoclay. Nnacor, Inc.

Ratna, D. (2009). Handbook of thermoset resins. Shawbury, UK: iSmithers.

Wendus, B.E., Stark, D.F., Holler, R.P., and Funkhouser, M.E. (2003). Follow-on technology requirement study for advanced subsonic transport. NASA/CR-2003-212467.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.

Merriam-Webster's collegiate dictionary, 11th Ed. (2009). p. 824.

Merriam-Webster's collegiate dictionary, 10th Ed. (2001). p. 1125-1126.

Whitaker, R. (1982). ALF 502: plugging the turbofan gap. Flight International, p. 237-241, Jan. 30, 1982.

Hughes, C. (2010). Geared turbofan technology. NASA Environmentally Responsible Aviation Project. Green Aviation Summit. NASA Ames Research Center. Sep. 8-9, 2010.

File History for U.S. Appl. No. 12/131,876.

Cusick, M. (1981). Avco Lycoming's ALF 502 high bypass fan engine. Society of Automotive Engineers, inc. Business Aircraft Meeting & Exposition. Wichita, Kansas. Apr. 7-10, 1981.

Fledderjohn, K.R. (1983). The TFE731-5: Evolution of a decade of business jet service. SAE Technical Paper Series. Business Aircraft Meeting & Exposition. Wichita, Kansas. Apr. 12-15, 1983.

Dickey, T.A. and Dobak, E.R. (1972). The evolution and development status of ALF 502 turbofan engine. National Aerospace Engineering and Manufacturing Meeting. San Diego, California. Oct. 2-5, 1972.

(56) References Cited

OTHER PUBLICATIONS

Gunston, B. (Ed.) (2000). Jane's aero-engines, Issue seven. Coulsdon, Surrey, UK: Jane's Information Group Limited.
Ivchenko-Progress D-436. Jane's Aero-engines, Aero-engines—Turbofan. Feb. 8, 2012.
Ivchenko-Progress AI-727M. Jane's Aero-engines, Aero-engines—Turbofan. Nov. 27, 2011.
Ivchenko-Progress D-727. Jane's Aero-engines, Aero-engines—Turbofan. Feb. 7, 2007.
Turbomeca Aubisque. Jane's Aero-engines, Aero-engines—Turbofan. Nov. 2, 2009.
Aviadvigatel D-110. Jane's Aero-engines, Aero-engines—Turbofan. Jun. 1, 2010.
Rolls-Royce M45H. Jane's Aero-engines, Aero-engines—Turbofan. Feb. 24, 2010.
Honeywell LF502. Jane's Aero-engines, Aero-engines—Turbofan. Feb. 9, 2012.
Honeywell LF507. Jane's Aero-engines, Aero-engines—Turbofan. Feb. 9, 2012.
Honeywell TFE731. Jane's Aero-engines, Aero-engines—Turbofan. Jul. 18, 2012.
NASA Conference Publication. Quiet, powered-lift propulsion. Cleveland, Ohio. Nov. 14-15, 1978.
"Civil Turbojet/Turbofan Specifications", Jet Engine Specification Database (Apr. 3, 2005).
Kandebo, S.W. (1993). Geared-turbofan engine design targets cost, complexity. Aviation Week & Space Technology, 148(8), p. 32.
Hendricks, E.S. and Tong, M.T. (2012). Performance and weight estimates for an advanced open rotor engine. NASA/TM-2012-217710.
Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883.
Zalud, T. (1998). Gears put a new spin on turbofan performance. Machine Design, 70(20), p. 104.
European Search Report for European Application No. 15170849.2 completed Nov. 23, 2015.

* cited by examiner

VARIABLE AREA NOZZLE FOR GAS TURBINE ENGINE

CROSS-REFERENCE TO RELATED APPLICATION

This application claims priority to U.S. Provisional Patent Application No. 62/009,480, filed Jun. 9, 2014.

BACKGROUND OF THE INVENTION

This application relates to a gas turbine engine wherein a cross-sectional area of a fan nozzle exit or throat may be varied.

Gas turbine engines are known and, typically, include a fan delivering air into a bypass duct as propulsion air. This air is also utilized for cooling. The air is also delivered into a core engine and into a compressor section. The air is compressed and delivered into a combustion chamber where it is mixed with fuel and ignited. Products of this combustion pass downstream over turbine rotors, driving them to rotate.

It is known that the cross-sectional area of an exhaust nozzle may be varied to provide different levels of power under different flight conditions.

SUMMARY OF THE INVENTION

In a featured embodiment, a variable area fan nozzle comprises an actuator flap and a follower flap. The actuator flap has a portion in contact with a portion of the follower flap. A bias member biases the follower flap outwardly. An actuator actuates the actuator flap inwardly and outwardly to, in turn, move the follower flap against the bias member and to vary an area of an exhaust nozzle. The flap actuator is operable to drive the actuator flap out of contact with the follower flap into a thrust reverser position.

In another embodiment according to the previous embodiment, a heat exchanger is positioned inwardly of one of the follower flap and the actuator flap.

In another embodiment according to any of the previous embodiments, the actuator is configured to move the follower flap to control airflow across the heat exchanger.

In another embodiment according to any of the previous embodiments, the follower flap has an upstream end which is configured to be moved away from an inner housing to allow airflow across the heat exchanger, and into contact with the housing to block airflow across the heat exchanger.

In another embodiment according to any of the previous embodiments, the upstream end is moved into contact with the housing when the actuator flap is moved into the thrust reverser position.

In another embodiment according to any of the previous embodiments, the actuator has a stop position configured to prevent movement of the actuator flap to the thrust reverser position.

In another embodiment according to any of the previous embodiments, the stop position is provided by a stop actuator which is configured to be moved to provide a stop to a linkage which is part of the actuator.

In another embodiment according to any of the previous embodiments, the stop actuator is operable to move the stop away from the stop position, such that the actuator may move the actuator flap to the thrust reverser position.

In another embodiment according to any of the previous embodiments, the actuator includes a sync ring configured to be driven to cause inward and outward movement of the actuator flap.

In another embodiment according to any of the previous embodiments, there are a plurality of circumferentially spaced ones of the actuator flap.

In another embodiment according to any of the previous embodiments, a downstream end of the follower flap is pivotally mounted to an inner housing wall.

In another embodiment according to any of the previous embodiments, the actuator has a stop position configured to prevent movement of the actuator flap to the thrust reverser position.

In another embodiment according to any of the previous embodiments, the stop position is provided by a stop actuator configured to be moved to provide a stop to a linkage which is part of the actuator.

In another embodiment according to any of the previous embodiments, the stop actuator is operable to move the stop away from the stop position, such that the actuator may move the actuator flap to the thrust reverser position.

In another embodiment according to any of the previous embodiments, the flap actuator includes a sync ring configured to be driven to cause inward and outward movement of the actuator flap.

In another embodiment according to any of the previous embodiments, there are a plurality of circumferentially spaced ones of the actuator flap.

In another embodiment according to any of the previous embodiments, a downstream end of the follower flap is pivotally mounted to an inner housing wall.

In another embodiment according to any of the previous embodiments, there are a plurality of circumferentially spaced ones of the actuator flap.

In another embodiment according to any of the previous embodiments, the flap actuator includes a sync ring configured to be driven to cause inward and outward movement of the actuator flap.

In another embodiment according to any of the previous embodiments, the flap actuator includes a sync ring configured to be driven to cause inward and outward movement of the actuator flap.

These and other features may be best understood from the following drawings and specification.

DETAILED DESCRIPTION

Figure 1:
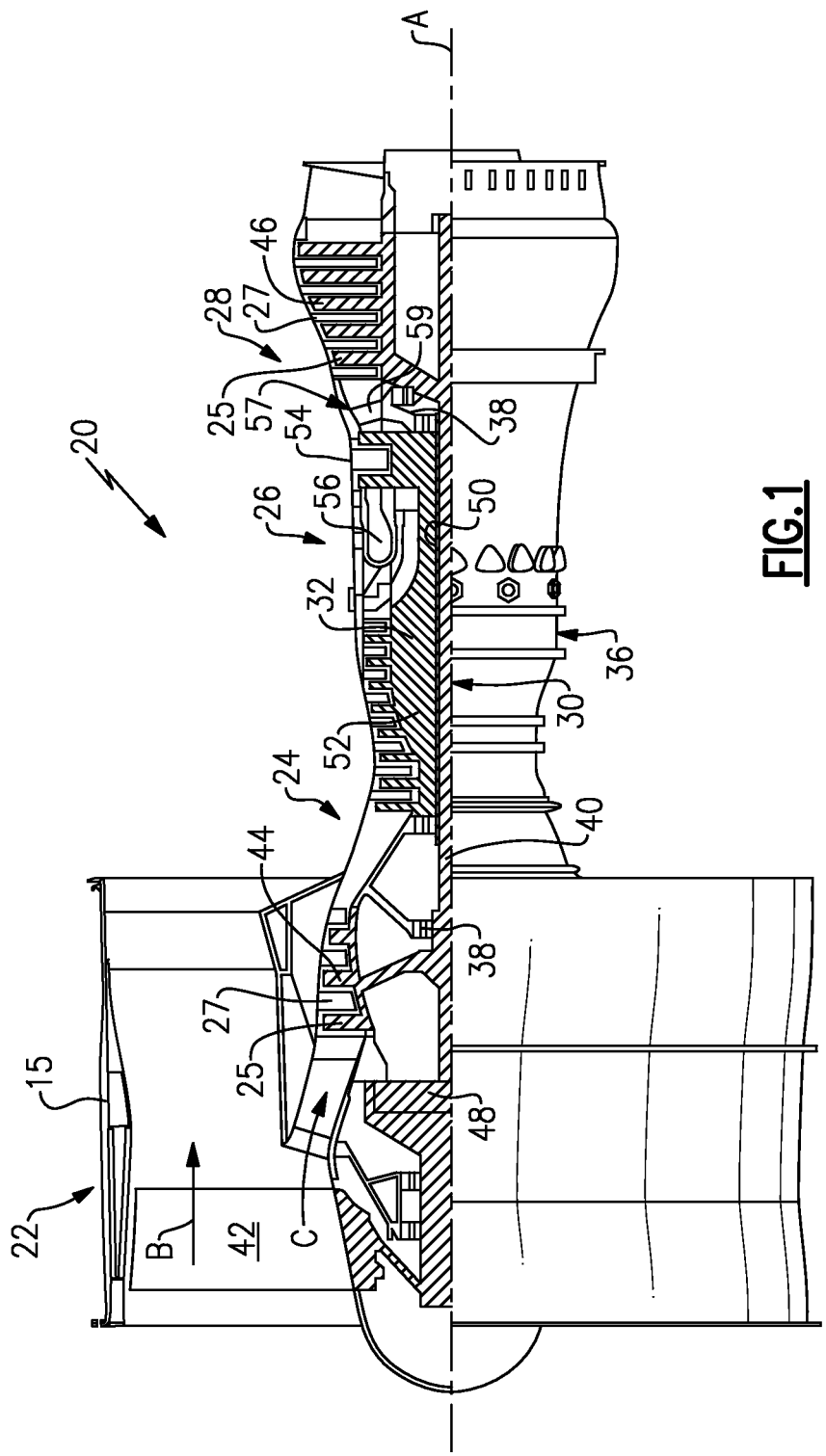
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a fan case 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2A:
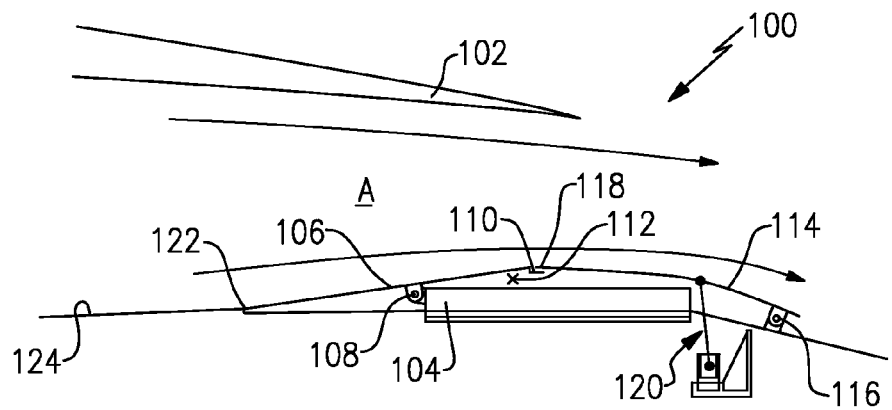
FIG. 2A shows a variable area nozzle in a first position.

FIG. 2A shows an embodiment of a variable area fan exhaust nozzle 100 where a cross-sectional area A radially inward of a nacelle 102 and outward of a moveable or flap provided by follower flap portion 106 and an actuator flap portion 114 can be varied. It should be understood that there are plurality of circumferentially spaced flap portions 106 and 114. A heat exchanger 104 is shown schematically, and may be an air/oil cooler, utilized for cooling oil associated with the engine.

The follower flap 106 is pivoted at 108 to static structure. A ditch 110 at a downstream end of the follower flap 106 receives a lip 118 of the actuator flap 114. A spring 112, shown schematically, biases the follower flap 106 radially outwardly. The actuator flap 114 pivots about a pivot point 116 and is driven by an actuator 120 to pivot radially inwardly or outwardly. In the position shown in FIG. 2A, the flow area A is at a minimum. This position may be utilized during engine warm-up or operation on a cold day. An upstream end 122 of the follower flap 106 is in contact with an inner surface 124. Note that pivot 108 is downstream of upstream end 122. In this position, no air passes across the air oil cooler 104.

Figure 2B:
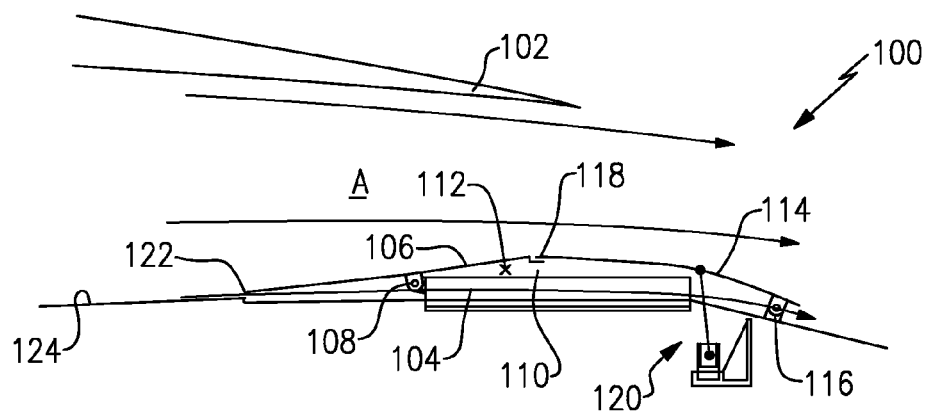
FIG. 2B shows a second position.

FIG. 2B shows an intermediate position. This position is consistent with portions of climb, cruise and descent, as well as ground operation, on a warm day. The actuator 120 has now pivoted the flaps 114 to a radially inner position relative to the FIG. 2A position. The lip 118 biases the follower flap 106 against the bias force of the springs 112. In this position, the upstream end 122 of the follower flaps 106 is shown to be spaced away from the housing surface 124. Thus, as can be seen, some cooling air passes across the air/oil cooler 104.

Figure 2C:
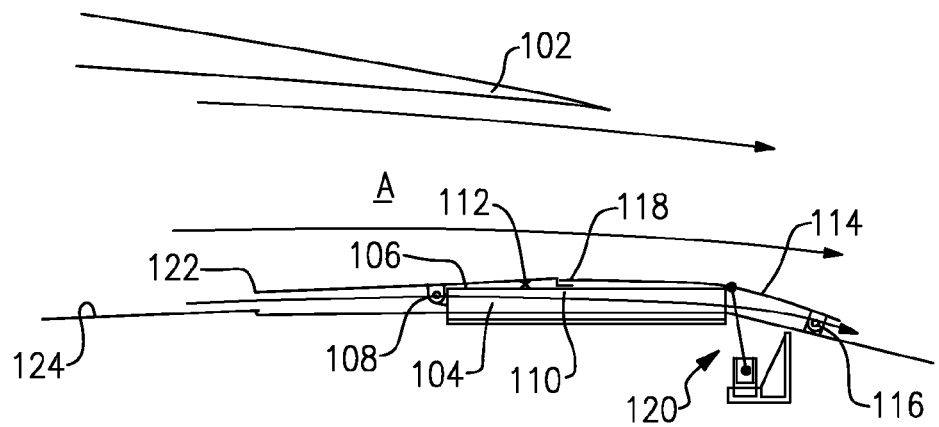
FIG. 2C shows a third position.

FIG. 2C shows yet another position wherein the actuator 120 has caused the actuator flaps 114 to pivot even more radially inwardly against the force of the springs 112. This position is associated with hot day ground idle, take-off and the beginning of climb of an associated aircraft. As shown, the upstream end 122 is spaced further away from the surface 124, thus, maximizing the flow of cooling air across the heat exchanger 104.

Figure 2D:
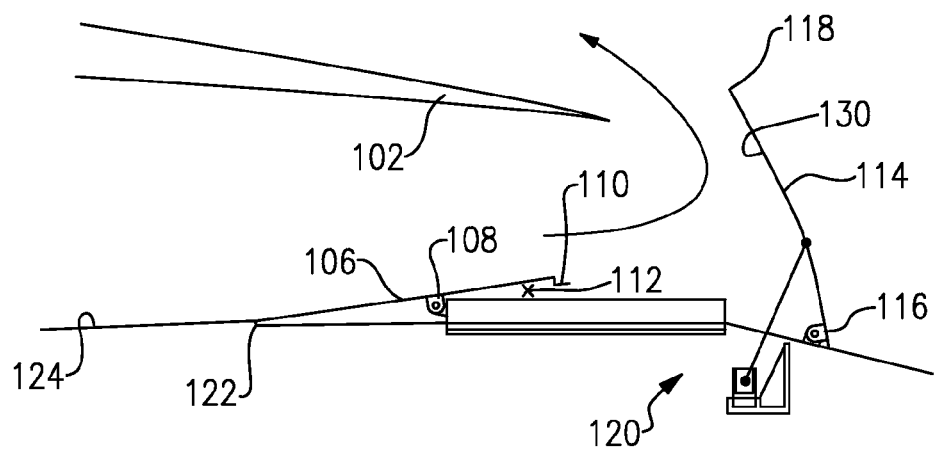
FIG. 2D shows a fourth position.

FIG. 2D shows a thrust reverser position. As is known, once an associated aircraft lands, it is desirable to have a reverse thrust to slow the aircraft down. The actuator 120 drives the actuator flap 114 radially outwardly and such that the lip 118 is no longer in contact with the ditch 110. The follower flaps 106 are now biased by the spring 112 such that they extend radially outwardly and such that the upstream end 122 is in contact with the surface 124. The follower flaps 106 thus tend to drive air radially outwardly and against an inner face 130 of the actuator flaps 114. As shown, the propulsion air is now delivered in an opposed direction and will tend to slow the associated aircraft.

Figure 3A:
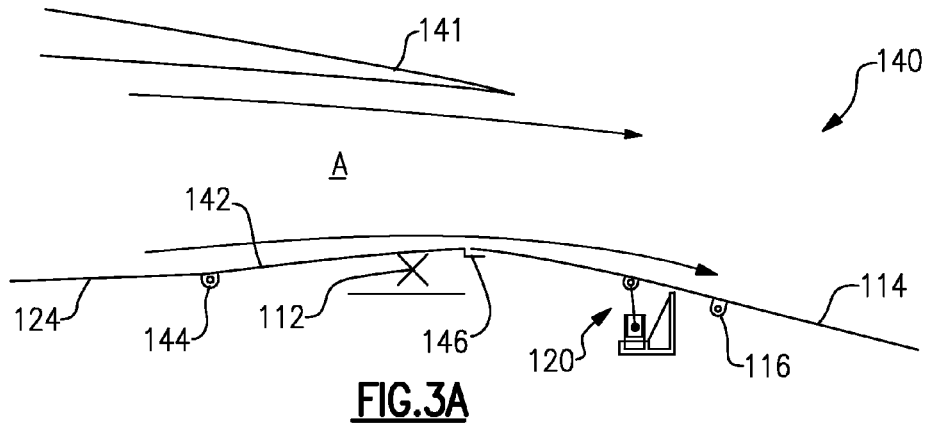
FIG. 3A shows a second embodiment of a variable area nozzle in a first position.

FIG. 3A shows a second nozzle embodiment 140, which operates similar to the embodiment 100 with the exception that the cooling function is no longer provided. In this embodiment, an upstream end of the follower flap 142 is pivoted at 144 to the housing 124. The position shown in FIG. 3A is similar to the fully closed position of FIG. 2A.

Figure 3B:
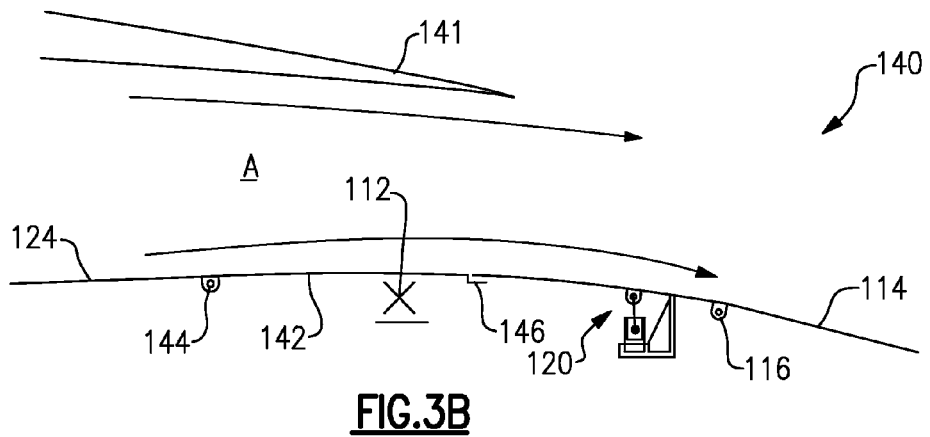
FIG. 3B shows a second position.

As shown in FIG. 3B, the nozzle 140 is moved to its maximum open position, such as shown in FIG. 2C.

Figure 3C:
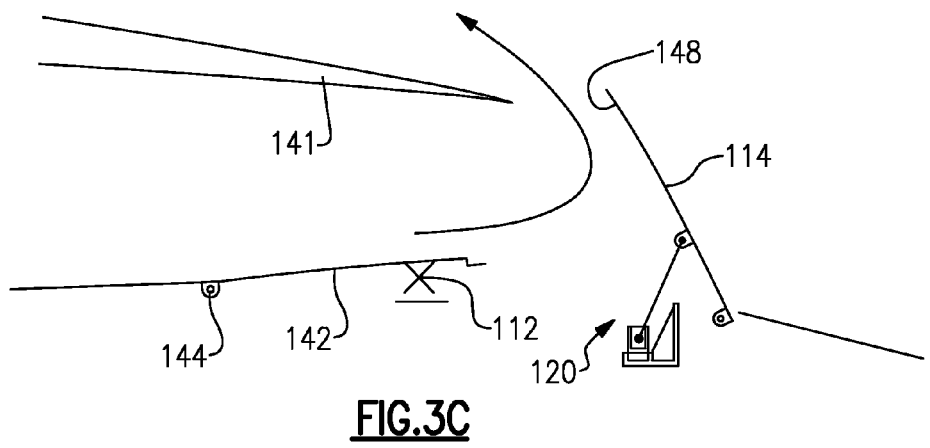
FIG. 3C shows a third position.

FIG. 3C shows a thrust reverser position. Again, the spring 112 has biased the follower flaps 142 radially outwardly such that they assist in directing air against the inner surface 148 of the actuator flaps 114.

In each of the embodiments, the variable area nozzle function is provided, along with a thrust reverser function. Thus, separate thrust reversers may be eliminated.

Figure 4A:
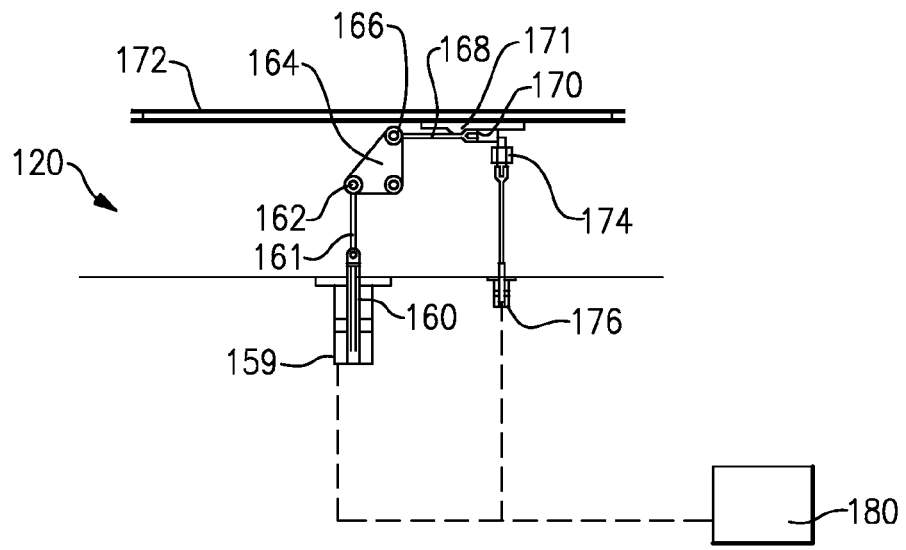
FIG. 4A shows a first position of an actuation structure.

FIG. 4A shows details of the actuator 120. As shown, a piston 160 can be driven to a plurality of positions within a fluid actuator 159. The fluid actuated flap actuator 159 is controlled by a control 180, which may be associated with a control for the overall engine. A piston rod 161 is pivoted at 162 to a bell crank 164. The bell crank 164 is also pivoted at 166 to another link 168. Link 168 drives a flange 171 through a ball joint 170. Flange 171 causes rotation of a sync ring 172.

As shown in this Figure, there is a stop 174. Stop 174 is driven by a linear actuator 176. The linear actuator 176 may be a simple two position actuator and is also controlled by the control 180. The stop 174 ensures that the actuator 159 will not inadvertently drive the flaps to the thrust reverser position.

Figure 4B:
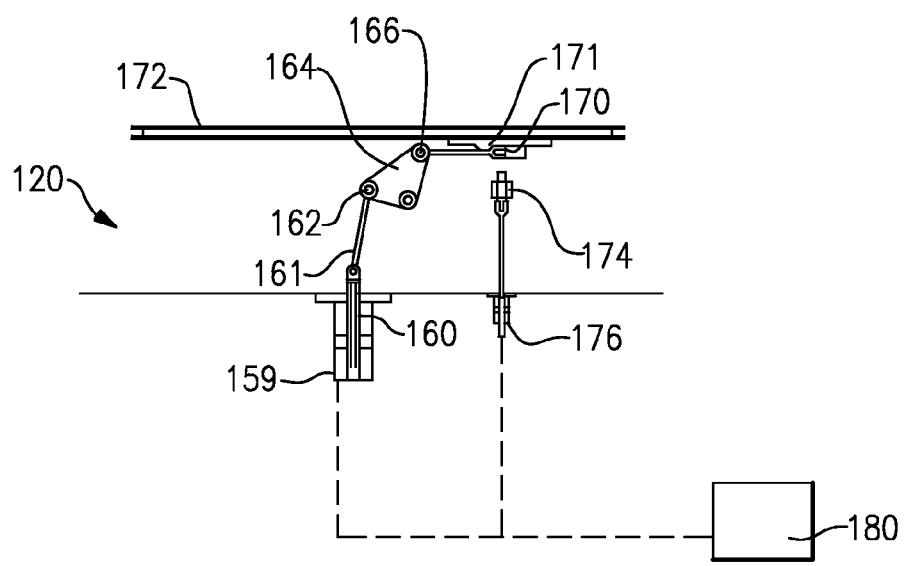
FIG. 4B shows a second position.

FIG. 4B shows the thrust reverser position. The stop 174 has been retracted and the flange 170 can be seen to have moved beyond the FIG. 4A position.

While a single stop is illustrated, in practice a redundant stop, e.g., in the flap actuator 159, may be included.

Thus, the flap actuator 159 for the actuator flap 114 has a stop position (FIG. 4A) which prevents movement of the actuator flap 114 to the thrust reverser position (FIGS. 2D and 3C).

Figure 5A:
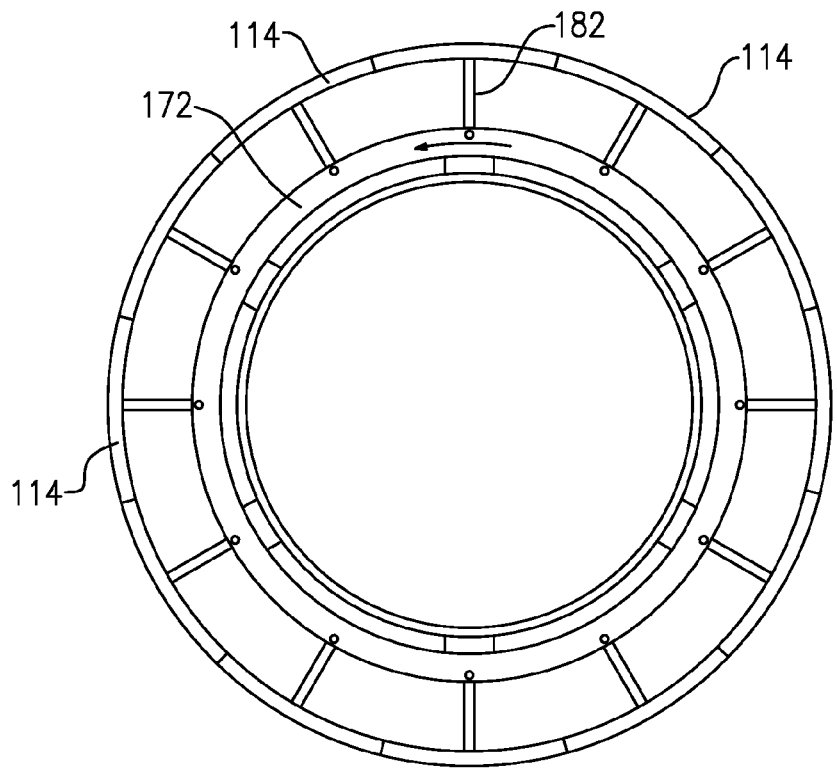
FIG. 5A shows a portion of a sync ring nozzle actuation system linkage in a first position.
Figure 5B:
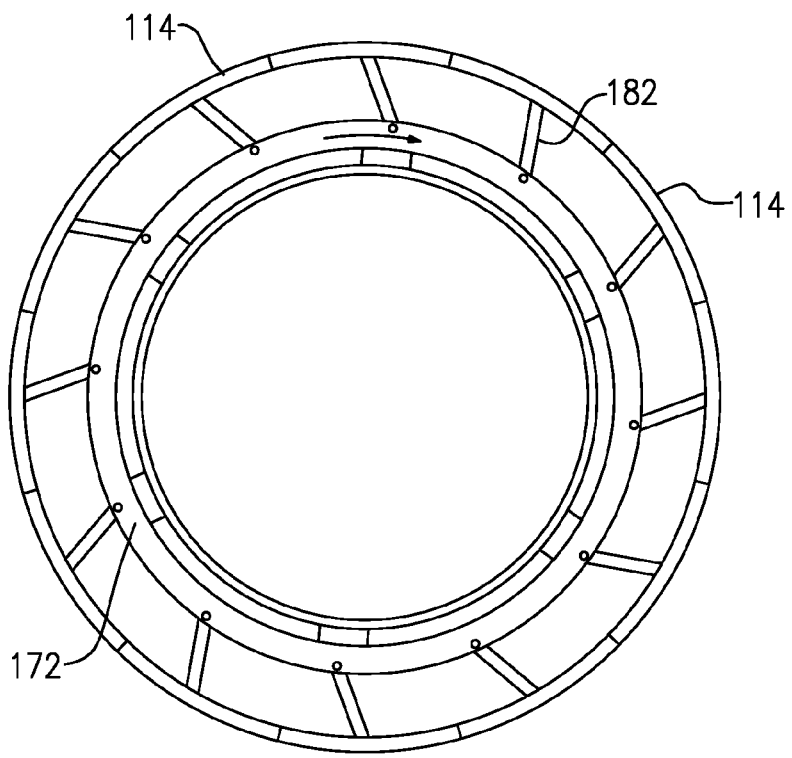
FIG. 5B shows a second position.

FIG. 5A shows sync ring 172, links 182, and the flaps 114. As can be appreciated, rotation of the sync ring 172 in a first direction causes the links 182 to extend generally radially outwardly and move the flaps 114 radially outwardly. Rotation of the sync ring 172 in an opposed direction, as shown in FIG. 5B, causes the links 182 to move inwardly and, in turn, bring the flaps 114 radially inwardly.

While a particular actuation structure is disclosed, a worker of ordinary skill in this art would recognize that any number of other actuator types would come within the scope of this application.

In summary, a variable area fan nozzle 100/140 comprises an actuator flap 114 and a follower flap 106/142. The actuator flap 114 has a portion 118 in contact with a portion 110 on the follower flap 106/142. A bias member 112 biases the follower flap 106/142 radially outwardly. A flap actuator 120 actuates the actuator flap 114 radially inwardly and outwardly to, in turn, move the follower flap 106/142 against the bias member 122 and vary an area A of a fan exhaust nozzle. The flap actuator 120 is operable to drive the actuator flap 114 out of contact with the follower flap 106/142 into a thrust reverser position (FIGS. 2D and 3C).

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A variable area fan nozzle comprising:
   an actuator flap and a follower flap, said actuator flap having a portion in contact with a portion of said follower flap, a bias member biasing said follower flap outwardly;
   an actuator for actuating said actuator flap inwardly and outwardly to, in turn, move said follower flap against the bias member and to vary an area of an exhaust nozzle; and
   said actuator being operable to drive said actuator flap out of contact with said follower flap into a thrust reverser position.

2. The variable area nozzle as set forth in claim 1, wherein a heat exchanger is positioned inwardly of one of said follower flap and said actuator flap.

3. The variable area nozzle as set forth in claim 2, wherein said actuator being configured to move said follower flap to control airflow across said heat exchanger.

4. The variable area nozzle as set forth in claim 3, wherein said upstream end is moved into contact with said housing when said actuator flap is moved into said thrust reverser position.

5. The variable area nozzle as set forth in claim 4, wherein said actuator has a stop position which is configured to prevent movement of said actuator flap to said thrust reverser position.

6. The variable area nozzle as set forth in claim 5, wherein said stop position being provided by a stop actuator which is configured to be moved to provide a stop to a linkage which is part of said actuator.

7. The variable area nozzle as set forth in claim 6, wherein said stop actuator is operable to move said stop away from said stop position, such that said actuator may move said actuator flap to said thrust reverser position.

8. The variable area nozzle as set forth in claim 7, wherein said actuator including a sync ring which is configured to be driven to cause inward and outward movement of said actuator flap.

9. The variable area nozzle as set forth in claim 7, wherein there are a plurality of circumferentially spaced actuator flaps.

10. The variable area nozzle as set forth in claim 7, wherein there are a plurality of circumferentially spaced actuator flaps.

11. The variable area nozzle as set forth in claim 10, wherein said flap actuator including a sync ring which is configured to be driven to cause inward and outward movement of said actuator flap.

12. The variable area nozzle as set forth in claim 2, wherein said follower flap has an upstream end which is configured to be moved: (a) away from an inner housing to allow airflow across said heat exchanger; and (b) into contact with said housing to block airflow across said heat exchanger.

13. The variable area nozzle as set forth in claim 12, wherein a portion of said follower flap, which is downstream of said upstream end, is pivotally mounted to an inner housing wall.

14. The variable area nozzle as set forth in claim 1, wherein said actuator has a stop position which is configured to prevent movement of said actuator flap to said thrust reverser position.

15. The variable area nozzle as set forth in claim 14, wherein said stop position being provided by a stop actuator which is configured to be moved to provide a stop to a linkage which is part of said actuator.

16. The variable area nozzle as set forth in claim 15, wherein said stop actuator is operable to move said stop away from said stop position, such that said actuator may move said actuator flap to said thrust reverser position.

17. The variable area nozzle as set forth in claim 16, wherein said flap actuator including a sync ring which is configured to be driven to cause inward and outward movement of said actuator flap.

18. The variable area nozzle as set forth in claim 17, wherein there are a plurality of circumferentially spaced actuator flaps.

19. The variable area nozzle as set forth in claim 18, wherein a portion of said follower flap, which is downstream of an upstream end, is pivotally mounted to an inner housing wall.

20. The variable area nozzle as set forth in claim 1, wherein said flap actuator including a sync ring which is configured to be driven to cause inward and outward movement of said actuator flap.

* * * * *